US008349216B2

United States Patent
Thakur

(10) Patent No.: US 8,349,216 B2
(45) Date of Patent: Jan. 8, 2013

(54) NONLINEAR OPTICAL APPLICATIONS OF NONCONJUGATED CONDUCTIVE POLYMERS

(76) Inventor: Mrinal Thakur, Auburn, AL (US)

(*) Notice: Subject to any disclaimer, the term of this patent is extended or adjusted under 35 U.S.C. 154(b) by 460 days.

(21) Appl. No.: 12/477,980

(22) Filed: Jun. 4, 2009

(65) Prior Publication Data

US 2009/0289230 A1 Nov. 26, 2009

Related U.S. Application Data

(63) Continuation-in-part of application No. 11/046,173, filed on Jan. 28, 2005, now Pat. No. 7,641,977.

(60) Provisional application No. 60/539,803, filed on Jan. 28, 2004.

(51) Int. Cl.
*H01B 1/00* (2006.01)
*H01L 29/08* (2006.01)

(52) U.S. Cl. .......................... 252/500; 257/40

(58) Field of Classification Search .................. 252/500; 257/40

See application file for complete search history.

(56) References Cited

U.S. PATENT DOCUMENTS

| 7,170,086 B2 | 1/2007 | Suh et al. |
| 7,455,916 B2 | 11/2008 | Hirose et al. |
| 2005/0048314 A1 | 3/2005 | Antoniadis et al. |

OTHER PUBLICATIONS

Yu et al., "Electrical Conduction in a Nonconjugated Polymer Doped with SnCl4 and SbCl5," Journal of Polymer Science: Part B: Polymer Physics, 32, pp. 2099-2104 (1994).*
Jiang, Z. et al., "Iodine-Doped Poly(ethylenepyrrolediyl) Derivatives: A New Class of Nonconjugated Conducting Polymers," Macromolecules, 25, pp. 880-882 (1992).*
Titus et al., "Electrical Conductivity in the Nonconjugated Polymer Styrene-Butadiene-Rubber (SBR)," American Physical Society, Annual APS March Meeting 2003, (Mar. 3-7, 2003).*
Seto et al., "Chemical Structure of Iodine-Doped Polyisoprene," Hyperfine Interactions, 68, pp. 213-216 (1991).*
Thakur et al., "Poly-beta-pinene, a Novel Nonconjugated Conductive Polymer," American Physical Society, Annual APS March Meeting 2004, (Mar. 22-26, 2004).*
Narayanan et al., "Electrical and Optical Properties of a Novel Nonconjugated Conductive Polymer, Polynorbornene" J. Macromolecular Science, Part A, 46(4), pp. 455-460 (Mar. 3, 2009).*
Dai et al., "Conducting Polymers from Polybutadiene: Molecular Configuration Effects on the Iodine-Induced Conjugation Reactions," Macromolecules, 27, pp. 6728-6735 (1994).*
Swamy et al., "Quadriatic electro-optic effect in a nano-optical material based on the nonconjugated conductive polymer, poly(ethylenepyrrolediyl) derivative," Solid State Communications, 143, pp. 519-521 (2007).*

(Continued)

*Primary Examiner* — Mark Kopec
*Assistant Examiner* — Jaison Thomas
(74) *Attorney, Agent, or Firm* — Next IP Law Group LLP; Harold L. Marquis

(57) ABSTRACT

Nonconjugated conductive polymers have a ratio of double bonds to total bonds of less than ½ are used to produce compositions with unexpected non-linear optical characteristics in this invention. Large third order optical effects including quadratic electro-optic effect and two-photon absorption have been measured in nonconjugated conductive polymers after doping the polymers. Among the nonconjugated polymers are styrene-butadiene-rubber copolymer (SBR), poly(β-pinene), poly(ethylene-pyrrolediyl) derivative, polynorbornene, cis-1,4 polyisoprene and trans-1,4 polyisoprene. The enhancement of the non-linear optical effect is due to the special charge-transfer complex structure and formation of nano-optical domains. Among the doping materials are electron acceptors such as iodine and antimony pentachloride.

1 Claim, 1 Drawing Sheet

OTHER PUBLICATIONS

Chilkoti et al., "X-ray Photoelectron Spectroscopy of Iodine-Doped Nonconjugated Polymers," Chem. Mater., 5, pp. 786-792 (1993).*

Kreja et al., "Studies no some properties of pristine and iodine-doped poly(phenylene sulfide)," J. Mater. Sci., 23, pp. 497-500 (1988).*

Thakur, M.; A Class of Conducting Polymers Having Nonconjugated Backbones; Macromolecules 1988; pp. 661-664.

Phillips, S.D., et al; Electrobsorption of Polyacetylene; The American Physical Society—Physical Review B; Nov. 15, 1989; vol. 40, No. 14; pp. 9751-9759.

Thakur, M., et al; Optical and Magnetic Properties of a Nonconjugated Conducting Polymer; American Institute of Physics; Feb. 1, 1989; pp. 2042-2044.

Brown, A.R., et al.; Poly (p-phenylenevinylene) Light-Emitting Diodes; Enhanced Electroluminescent Efficiency Through Charge Carrier Confinement; American Institute of Physics; Dec. 7, 1992; pp. 2793-2795.

* cited by examiner

NONLINEAR OPTICAL APPLICATIONS OF NONCONJUGATED CONDUCTIVE POLYMERS

CROSS-REFERENCE TO RELATED APPLICATION

This application is a continuation-in-part which claims priority to copending U.S. non-provisional application entitled, "NOVEL APPLICATIONS OF NONCONJUGATED CONDUCTIVE POLYMERS," having Ser. No. 11/046,173, filed Jan. 28, 2005, which claims priority to copending U.S. provisional application entitled, "NOVEL APPLICATIONS OF NONCONJUGATED CONDUCTIVE POLYMERS," having Ser. No. 60/539,803, filed Jan. 28, 2004, which are entirely incorporated herein by reference.

BACKGROUND OF THE INVENTION

Field of the Invention

This invention relates to non-linear optical applications of nonconjugated conductive polymers. Nonconjugated conductive polymers have a least one double bond which is repeated in a ratio of double bond to total bonds that is a lower fraction than ½. It has been found that these polymers have novel non-linear optical properties.

SUMMARY OF THE INVENTION

Plastic polymers have a wide range of applications. In this disclosure, a novel non-linear optical application of nonconjugated conductive polymers is discussed. Conjugated polymers have a repeat with one double bond followed by a single bond, which is followed by another double bond and a single bond. Thus, there is a ratio of double bonds to total bonds, ½. Nonconjugated conductive polymers include polymers with at least one double bond in the repeat. Nonconjugated polymers include all of those polymers that have a ratio of double bond to total bonds, that is a lower fraction than ½. It includes polymers where there is only one double bond in each repeat. It will be recognized that there can be two or more double bonds in the repeat if the ratio of double bonds and total bonds is lower than "½." Upon doping, a charge-transfer takes place between the isolated double bond of the polymer and the dopant. For example, in the case of iodine doping, an electron is transferred from the double bond to iodine, thus, creating a radical cation consisting of a hole or positive charge and a radical at the double bond site. This hole then participates in the electrical conductivity through intersite hopping. The conductivity increases by about 100 billion times upon doping.

It has been found that by doping these nonconjugated polymers with iodine unusual and novel materials and properties are obtained as explained infra.

Figure 1:
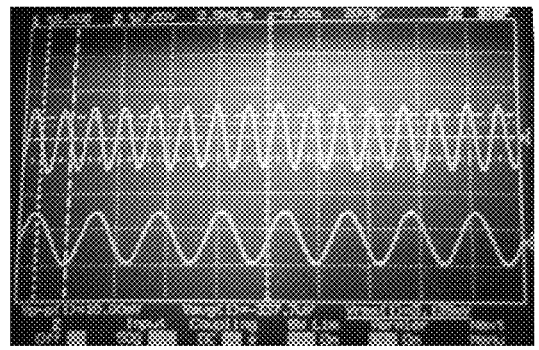
FIG. 1 shows the oscilloscope trace of modulation due to quadratic electro-optic effect in iodine-doped polyisoprene. The upper waveform represents the modulation and the lower waveform represents the applied voltage.

DETAILED DESCRIPTION OF THE PREFERRED EMBODIMENTS OF NONLINEAR OPTICAL APPLICATIONS OF NONCONJUGATED CONDUCTIVE POLYMERS

Large nonlinear optical susceptibilities, in particular, third order optical susceptibilities are usually observed in conjugated polymers. The large susceptibilities are due to delocalization of electrons along the conjugated chain. In contrast, nonconjugated polymers with isolated double bonds do not have delocalized electrons and are not expected to display significant non-linear optical effects. In this disclosure, exceptionally large non-linear optical susceptibilities of specific nonconjugated conductive polymers are discussed. This observation is unexpected based on existing results and understanding based on conjugated conductive polymers. As it will be shown, doped nonconjugated conductive polymers have significantly larger nonlinear optical susceptibilities than most other nonlinear optical materials including doped conjugated conductive polymers.

The nonlinear optical effects that will be disclosed include: (i) quadratic electro-optic effect and (ii) all-optical effect. In (i) the refractive index of the non-linear optical material changes quadratically with an applied electric field. In (ii) the refractive index changes linearly with the intensity of an optical beam. The changes in the refractive index is measured using standard optical techniques.

The nonconjugated conductive polymers which have been investigated in detail include: cis-1,4 polyisoprene, styrene-butadiene-rubber copolymer (SBR), poly(ethylene-pyrrolediyl), polynorbornene, poly($\beta$-pinene) and trans-1,4 polyisoprene. The observation as disclosed here can be extended to all other nonconjugated conductive polymers since all nonconjugated conductive polymers are soluble and processable.

A wide range of applications are expected based on the electro-optic and all-optical effects. These include applications in research equipments (Kerr Cells), switching and modulation in signal processing and telecommunication, beam steering, spatial light modulators, optical computing and many others. The mechanisms of the applications involve modulating the phase or intensity of an optical beam using an external electric field or the intensity of another optical beam.

The measured large quadratic electro-optic effect has been attributed to the hole (positive charge) loosely bound to the acceptor molecule in the doped film. The loosely bound positive charge can be modeled as a spring-mass system with a quadratic term in the potential energy. As it is well known, the quadratic and cubic terms in the harmonic oscillator potential energy lead to the first order and second order optical susceptibilities respectively. The quartic term leads to the third order optical susceptibility or the quadratic electro-optic effect. The contribution of the quartic term for a loose spring can be significant leading to exceptionally large third order optical effects in this system. The material being isotropic, the cubic term is not present and therefore it does not display second order optical or linear electro-optic effect. The third order optical or the quartic electro-optic effect is large because of the higher magnitude of the quartic term and also due to the confinement of the charge within a nanometer dimension. Thus doped nonconjugated conductive polymers represent a new class of nano-optical materials (quantum dots). As it is well known, nanomaterials, nanodevices and nanotechnology are presently highly active areas of research. Doped polyisoprene has special charge-transfer complex structures and confinement within a nanometer domain. This leads to the exceptionally large quadratic electro-optic effect or third order optical property of this nano-optical polymer (quantum dots) as shown below:

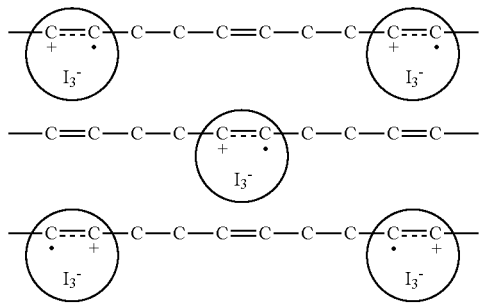

These nonconjugated polymers can be doped with an electron acceptor, such as iodine and antimony pentachloride.

DOCTRINE OF EQUIVALENTS

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

Example 1

Cis-1,4 polyisoprene (natural rubber) samples were obtained in the form of latex from The Firestone Company. Evaporation of water from a small latex sample led to solid natural rubber. The rubber sample was dissolved in hexane to prepare a solution. Gold electrodes with a gap of approximately 100 microns were deposited on a glass slide. Then a thin film of natural rubber was cast on the electrodes on the glass slide from the hexane solution. The film was about 2 microns in thickness. Upon doping with iodine, the film appeared dark in color.

The doped film was studied for non-linear optical properties with electric field applied across the gold electrodes. A Helium-Neon laser with wavelength at 633 nm was used for the experiment. The method of measurement included field-induced birefringence in the cross-polarized geometry. This method has been discussed in other reports. In short, the laser beam with polarization at 45° with respect to the applied electric field was passed through the sample. After passing through an analyzer the beam was detected with a photodiode and recorded on an oscilloscope. The modulation signal was recorded on the oscilloscope for various applied ac fields. The signal as obtained for a field of 2 V/μm is shown in FIG. 1. The lower waveform represents the applied ac field at 4 kHz. The modulation shown in the waveform above (FIG. 1) is due to the quadratic electro-optic effect in the doped polyisoprene film. The modulation signal was also recorded using a lock-in amplifier (with 2f synchronization). The signal increased quadratically with the applied voltage. A modulation of 0.8% was observed for a field of 2 V/μm and the film thickness was 2 μm. The change in refractive index, $\Delta n$, is $4.0 \times 10^{-4}$ at a field of 2.0 V/μm. The magnitude of the quadratic electro-optic effect is exceptionally large. The Kerr constant as determined is about $1.6 \times 10^{10}$ μm/V². For comparison, the Kerr constant of nitrobenzene at 589 nm is $2.4 \times 10^{-12}$ m/V². The Kerr constant was determined using the equation: $K=(\Delta n)/(\lambda E^2)$, where $\Delta n$ is the change in refractive index caused by the field, $\lambda$ is the wavelength and E is the electric field. The value is significantly larger than that of the conjugated polymer, polyacetylene, at a wavelength with a similar detuning with respect to the absorption maximum. This is highly unexpected.

Doped polyisoprene absorbs strongly over the wavelength range of 250-625 nm. At an intermediate doping level (iodine molar concentration ~0.3), the lower energy peak appears at 400 nm. At high doping (iodine molar concentration ~0.7), the film becomes dark and absorbs throughout the visible. The experiments performed here involved films with doping levels in the intermediate to high range (molar concentration of 0.3-0.8). The wavelength used (632 nm) was away from the absorption maximum (400-450 nm). The observed Kerr constant is 66 times that of nitrobenzene, one of the best known third order optical material.

The polyisoprene film was also studied using 200 fs laser pulses at 750 nm wavelength. The change in refractive index was measured using Mach-Zhender interferometry as the intensity of the laser beam was increased. A large change in the refractive index was measured consistent with the Kerr coefficient.

The large quadratic electro-optic or third order optical effect has been attributed to the special charge-transfer complex structure and the nano-optical characteristic of the doped polymer.

Example 2

Styrene-butadiene-rubber copolymer (SBR) samples were obtained in the form of latex from Goodyear Tire and Rubber Company. Evaporation of water from a small latex sample led to solid SBR. The rubber sample was dissolved in hexane to prepare a solution. Gold electrodes with a gap of approximately 100 microns were deposited on a glass slide. Then a thin film of SBR was cast on the electrodes on the glass slide from the hexane solution. The film was about 3 microns in thickness. Upon doping with iodine, the film appeared dark in color.

The doped film was studied for non-linear optical properties with electric field applied across the gold electrodes. A Helium-Neon laser with wavelength at 633 nm was used for the experiment. The method of measurement included field-induced birefringence in the cross-polarized geometry. This method has been discussed in other reports. In short, the laser beam with polarization at 45° with respect to the applied electric field was passed through the sample. After passing through an analyzer the beam was detected with a photodiode and recorded on an oscilloscope. The modulation signal was recorded on the oscilloscope for various applied ac fields. A modulation depth of about 1% was observed for a field of 2 V/μm.

Doped SBR absorbs strongly over the wavelength range of 250-610 nm. At an intermediate doping level, the lower energy peak appears at 395 nm. At high doping, the film becomes dark and absorbs throughout the visible. The experiments performed here involved films with doping levels in the intermediate to high range. The wavelength used (632 nm) was away from the absorption maximum (395-410 nm). The observed Kerr constant is about 58 times that of nitrobenzene, one of the best known third order optical material.

The SBR film was also studied using 200 fs laser pulses at 750 nm wavelength. The change in refractive index was measured using Mach-Zhender interferometry as the intensity of the laser beam was increased. A large change in the refractive index was measured consistent with the Kerr coefficient.

The large quadratic electro-optic or third order optical effect has been attributed to the special charge-transfer complex structure and the nano-optical characteristic of the doped polymer.

Example 3

Poly($\beta$-pinene) samples were obtained in the form of pellets from Aldrich Chemical Company, Inc. Gold electrodes with a gap of approximately 100 microns were deposited on a glass slide. A thin film of the polymer (poly($\beta$-pinene)) was formed on the glass substrate from a solution in toluene. The film was about 1 micron in thickness. Upon doping with iodine, the film appeared dark in color.

The doped film was studied for non-linear optical properties with an electric field applied across the gold electrodes. A Helium:Neon laser operating at a wavelength of 633 nm was used for the experiment. The method of measurement included field-induced birefringence in the cross-polarized geometry. This method has been discussed in other reports. In short, the laser beam with polarization at 45° with respect to the applied electric field was passed through the sample. After passing through an analyzer the beam was detected with a photodiode and recorded on an oscilloscope. The modulation signal was recorded using a lock-in amplifier (2f synchronization) and also on the oscilloscope for various applied ac fields. The signal increased quadratically with the applied voltage. A modulation of about 0.12% was observed for a field of 1.25 V/$\mu$m and the film thickness was 1 $\mu$m. The magnitude of the quadratic electro-optic effect is exceptionally large. The Kerr constant as determined is about $1.2 \times 10^{-10}$ m/V$^2$. For comparison, the Kerr constant of nitrobenzene at 589 nm is $2.4 \times 10^{-12}$ m/V$^2$. The Kerr constant was determined using the equation: $K=(\Delta n)/(\lambda E^2)$, where $\Delta n$ is the change in refractive index caused by the field, $\lambda$ is the wavelength and E is the electric field. The value is significantly larger than that of the conjugated polymer, polyacetylene, and other materials. This is highly unexpected. These films have applications in electro-optic switches and modulators.

Example 4

Cis-1,4 polyisoprene (natural rubber) samples were obtained in the form of latex from The Firestone Company. Evaporation of water from a small latex sample led to a solid natural rubber. The rubber sample was dissolved in hexane to prepare a solution. Gold electrodes with a gap of approximately 100 microns were deposited on a glass slide. Then a thin film of natural rubber was cast on the electrodes on the glass slide from the hexane solution. The film was about 2 microns in thickness. Upon doping with iodine, the film appeared dark in color.

The doped film was studied for non-linear optical properties with an electric field applied across the gold electrodes. A Ti:Sapphire laser with a wavelength at about 800 nm and a semiconductor laser with a wavelength at 1550 nm were used for the experiment. The method of measurement included field-induced birefringence in the cross-polarized geometry. This method has been discussed in other reports. In short, the laser beam with polarization at 45° with respect to the applied electric field was passed through the sample. After passing through an analyzer the beam was detected with a photodiode and recorded on an oscilloscope. The modulation signal was recorded using a lock-in amplifier (2f synchronization) and also on the oscilloscope for various applied ac fields. The signal increased quadratically with the applied voltage. A modulation of about 0.1% was observed for a field of 1 V/$\mu$m and the film thickness was 2 $\mu$m. The magnitude of the quadratic electro-optic effect is exceptionally large. The Kerr constant as determined is about $8 \times 10^{-11}$ mN$^2$. For comparison, the Kerr constant of nitrobenzene at 589 nm is $2.4 \times 10^{-12}$ mN$^2$. The Kerr constant was determined using the equation: $K=(\Delta n)/(\lambda E^2)$, where $\Delta n$ is the change in refractive index caused by the field, $\lambda$ is the wavelength and E is the electric field. The value is significantly larger than that of the conjugated polymer, polyacetylene, and other materials. This is highly unexpected. These films have applications in electro-optic switches and modulators operating at technologically important wavelengths such as 800 and 1550 nm.

The doped polyisoprene film was also studied using 200 fs laser pulses at 750 nm wavelength. The change in refractive index was measured using Mach-Zhender interferometry as the intensity of the laser beam was increased. A large change in the refractive index was measured consistent with the Kerr coefficient. The large quadratic electro-optic or third order optical effect has been attributed to the special charge-transfer complex structure and the nano-optical characteristic of the doped polymer.

Example 5

Poly($\beta$-pinene) samples were obtained in the form of pellets from Aldrich Chemical Company, Inc. Gold electrodes with a gap of approximately 100 microns were deposited on a glass slide. A thin film of the polymer (poly($\beta$-pinene)) was formed on the glass substrate from a solution in toluene. The film was about 1 micron in thickness. Upon doping with iodine, the film appeared dark in color.

The doped film was studied for non-linear optical properties with electric field applied across the gold electrodes. A Ti:Sapphire laser with a wavelength at about 800 nm and a semiconductor laser with a wavelength at 1550 nm were used for the experiment. The method of measurement included field-induced birefringence in the cross-polarized geometry. This method has been discussed in other reports. In short, the laser beam with polarization at 45° with respect to the applied electric field was passed through the sample. After passing through an analyzer the beam was detected with a photodiode and recorded on an oscilloscope. The modulation signal was recorded using a lock-in amplifier (2f synchronization) and also on the oscilloscope for various applied ac fields. The signal increased quadratically with the applied voltage. A modulation of about 0.1% was observed for a field of 1 V/$\mu$m and the film thickness was 1 $\mu$m. The magnitude of the quadratic electro-optic effect is exceptionally large. The Kerr constant as determined is about $1.6 \times 10^{10}$ $\mu$m/V$^2$. For comparison, the Kerr constant of nitrobenzene at 589 nm is $2.4 \times 10^{-12}$ m/V$^2$. The Kerr constant was determined using the equation: $K=(\Delta n)/(\lambda E^2)$, where $\Delta n$ is the change in refractive index caused by the field, $\lambda$ is the wavelength and E is the electric field. The value is significantly larger than that of the conjugated polymer, polyacetylene, and other materials. This is highly unexpected. These films have applications in electro-optic switches and modulators operating at technologically important wavelengths such as 800 and 1550 nm.

The doped poly($\beta$-pinene) film was also studied using 150 fs laser pulses at 750 nm wavelength. The change in refractive index was measured using Mach-Zhender interferometry as the intensity of the laser beam was increased. A large change in the refractive index was measured consistent with the Kerr coefficient. The large quadratic electro-optic or third order optical effect has been attributed to the special charge-transfer complex structure and the nano-optical characteristic of the doped polymer.

Example 6

Poly(ethylene-pyrrolediyl) derivative samples were synthesized using a standard literature procedure. Gold electrodes with a gap of approximately 100 microns were deposited on a glass slide. A thin film of the polymer was formed on the glass substrate from a solution in chloroform. The film was about 0.3 micron in thickness. Upon doping with iodine, the film appeared dark in color.

Figure 2:
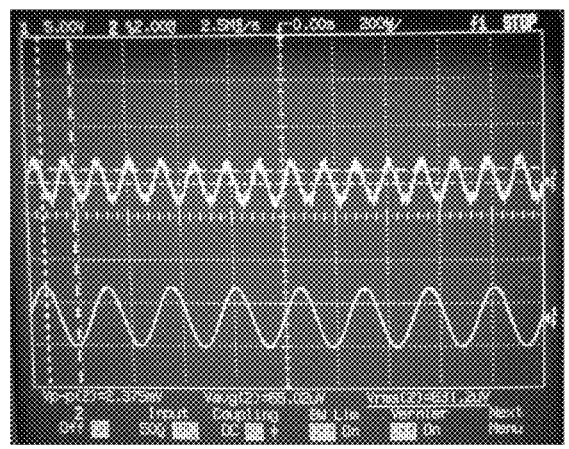
FIG. 2 shows an oscilloscope trace of the modulation signal in quadratic electro-optic measurement of doped poly (ethylenepyrrolediyl) derivative. The waveform at the bottom represents the applied voltage at 4 kHz. The waveform above corresponds to the quadratic electro-optic modulation signal.

The doped film was studied for non-linear optical properties with electric field applied across the gold electrodes. A Helium-Neon laser with wavelength at 633 nm was used for the experiment. The method of measurement included field-induced birefringence in the cross-polarized geometry. This method has been discussed in other reports. In short, the laser beam with polarization at 45° with respect to the applied electric field was passed through the sample. After passing through an analyzer the beam was detected with a photodiode and recorded on an oscilloscope. The modulation signal was recorded on the oscilloscope for various applied ac fields (FIG. 2). The modulation signal was also recorded using a lock-in amplifier (with 2f synchronization). The signal increased quadratically with the applied voltage. A modulation of 0.1% was observed for a field of 0.66 V/μm and the film thickness was 0.3 μm. The magnitude of the quadratic electro-optic effect is exceptionally large. The Kerr constant as determined is about $1.2 \times 10^{-9}$ m/V$^2$. For comparison, the Kerr constant of nitrobenzene at 589 nm is $2.4 \times 10^{-12}$ m/V$^2$. The Kerr constant was determined using the equation: $K=(\Delta n)/(\lambda E^2)$, where $\Delta n$ is the change in refractive index caused by the field, $\lambda$ is the wavelength and E is the electric field. The value is significantly larger than that of the conjugated polymer, polyacetylene, at a wavelength with a similar detuning with respect to the absorption maximum. This is highly unexpected.

Doped poly(ethylene-pyrrolediyl) derivative absorbs strongly over the wavelength range of 250-600 nm. At an intermediate doping level (iodine molar concentration ~0.3), the lower energy peak appears at 400 nm. At high doping (iodine molar concentration ~0.8), the film becomes dark and absorbs throughout the visible spectrum. The experiments performed here involved films with doping levels in the intermediate to high range (molar concentration of 0.3-0.6). The wavelength used (633 nm) was away from the absorption maximum. The observed Kerr constant is 495 times that of nitrobenzene, one of the best known third order optical material.

The poly(ethylene-pyrrolediyl) derivative film was also studied using 150 fs laser pulses at 750 nm wavelength. The change in refractive index was measured using Mach-Zhender interferometry as the intensity of the laser beam was increased. A large change in the refractive index was measured consistent with the Kerr coefficient. The large quadratic electro-optic or third order optical effect has been attributed to the special charge-transfer complex structure and the nano-optical characteristic of the doped polymer.

Example 7

Polynorbornene samples were purchased from Aldrich Chemical Company, Inc. Gold electrodes with a gap of approximately 100 microns were deposited on a glass slide. A thin film of the polymer was formed on the glass substrate from a solution in benzene. The film was about 0.1 micron in thickness. Upon doping with iodine, the film appeared dark in color.

The doped film was studied for non-linear optical properties with electric field applied across the gold electrodes. A Helium-Neon laser with a wavelength at 633 nm was used for the experiment. The method of measurement included field-induced birefringence in the cross-polarized geometry. This method has been discussed in other reports. In short, the laser beam with polarization at 45° with respect to the applied electric field was passed through the sample. After passing through an analyzer the beam was detected with a photodiode and recorded on an oscilloscope. The modulation signal was recorded on the oscilloscope for various applied ac fields. The modulation signal was also recorded using a lock-in amplifier (with 2f synchronization). The signal increased quadratically with the applied voltage. A modulation of 0.01% was observed for a field of 0.66 V/μm and the film thickness was 0.1 μm. The magnitude of the quadratic electro-optic effect is exceptionally large. The Kerr constant as determined is about $1.7 \times 10^{-11}$ mN$^2$. For comparison, the Kerr constant of nitrobenzene at 589 nm is $2.4 \times 10^{-12}$ m/V$^2$. The Kerr constant was determined using the equation: $K=(\Delta n)/(\lambda E^2)$, where $\Delta n$ is the change in refractive index caused by the field, $\lambda$ is the wavelength and E is the electric field. The value is significantly larger than that of the conjugated polymer, polyacetylene, at a wavelength with a similar detuning with respect to the absorption maximum. This is highly unexpected.

Doped polynorbornene absorbs strongly over the wavelength range of 250-580 nm. At an intermediate doping level (iodine molar concentration ~0.3), the lower energy peak appears at 400 nm. At high doping (iodine molar concentration ~0.8), the film becomes dark and absorbs throughout the visible spectrum. The experiments performed here involved films with doping levels in the intermediate to high range (molar concentration of 0.3-0.6). The wavelength used (633 nm) was away from the absorption maximum. The observed Kerr constant is 7 times that of nitrobenzene, one of the best known third order optical material.

Example 8

Poly(β-pinene) samples were obtained in the form of pellets from Aldrich Chemical Company, Inc. A thin film of the polymer, poly(β-pinene) was formed on the glass substrate from a solution in toluene. The film was about 1 micron in thickness. Upon doping with iodine, the film appeared dark in color.

Figure 3:
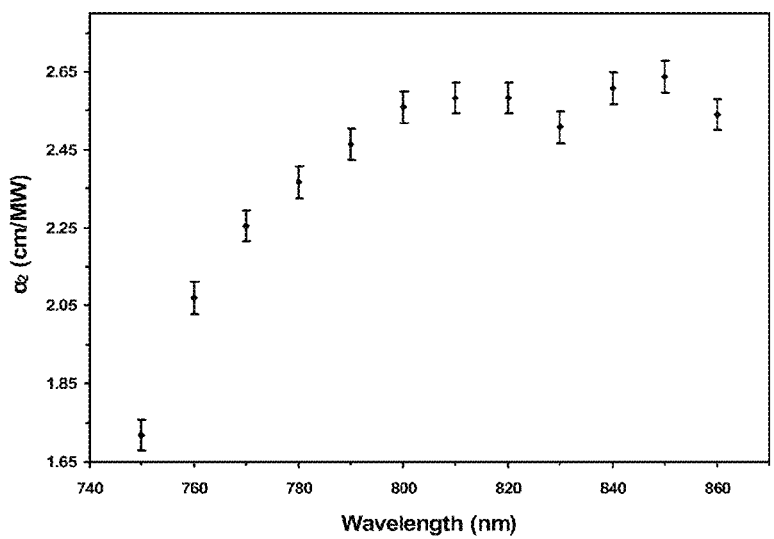
FIG. 3 is a graph showing two-photon absorption coefficient of iodine-doped poly($\beta$-pinene) as a function of wavelength. Two peaks at 810 nm (1.53 eV) and 850 nm (1.46 eV) have been observed.

Two-photon absorption (non-linear absorption) measurement of the film was made using 150 femtosecond pulses from a Ti:Sapphire laser at wavelengths of 740 to 900 nm. The established method of z-scan was used to make these measurements. The laser beam was passed through an attenuator to control the input power of the beam. The beam was then focused using an objective lens (5×). The sample mounted on a motorized X-Y stage, with a precision of 0.1 micron, was moved through the focus along the beam propagation direction (z-axis). The output power was measured as a function of the sample position (z). Data were recorded for continuous wave (cw) and in modelocked (pulsing) conditions to separate any effect of scattering. Two-photon absorption is given by, $\Delta\alpha=\alpha_2 I$, where $\Delta\alpha$ is the change in the linear absorption coefficient, $\alpha_2$ is the two-photon absorption coefficient and I is the peak intensity. From the z-scan data, the magnitude of the two-photon absorption coefficient was determined. The maximum two-photon absorption coefficient ($\alpha_2$) was obtained at about 810 nm (1.53 eV) and also at 850 nm (1.46 eV), with a magnitude of about 2.6 cm/MW which is significantly larger compared to known materials (FIG. 3). The maximum is near half of the optical gap (3.1 eV) corresponding to charge-transfer in doped poly($\beta$-pinene). The large magnitude of two-photon absorption coefficient ($\alpha_2$) has been attributed to the special structure of the radical cation and charge-transfer sites confined within a sub-nanometer dimension. The applications of such large two-photon absorption include: optical limiting and ultrafast (pico- and femtosecond) optical modulators.

CHARACTERISTICS

Third order optical effects including quadratic electro-optic effects essentially involve change of refractive index or absorption coefficients in a material when a high-intensity optical beam or an electric field (voltage) is applied on the material. Such changes in refractive index or absorption coefficient are used for switching or modulation of an optical beam with a voltage or another optical beam. Optical switches and modulators have a wide range of applications in optoelectronics and telecommunication technologies. The materials considered have large effects leading to more efficient modulators or switches. Large changes (increase) in absorption also known as two-photon absorption has applications as optical limiters and ultrafast optical modulators. The characteristics of the materials and structures considered have the following characteristics:

1. Very large third order optical effects including quadratic electro-optic coefficients (Kerr coefficients) have been observed in nonconjugated conductive polymers after doping.
2. The magnitude of the Kerr coefficient of doped cis-1,4 polyisoprene (natural rubber) at 633 nm wavelength is 66 times larger than that of nitrobenzene which is standard third order optical material.
3. The magnitude of the Kerr coefficient of doped SBR at 633 nm wavelength is 58 times that of nitrobenzene.
4. The magnitude of the Kerr coefficient of doped poly($\beta$-pinene) at 633 nm wavelength is 50 times that of nitrobenzene.
5. The magnitude of the Kerr coefficient of doped poly (ethylene pyrrolediyl) derivative at 633 nm wavelength is 495 times that of nitrobenzene.
6. The magnitude of the Kerr coefficient of doped cis-1,4 polyisoprene is at 1550 nm wavelength is 43 times that of nitrobenzene.
7. The magnitude of the Kerr coefficient of doped poly($\beta$-pinene at 1550 nm wavelength is 66 times that of nitrobenzene.
8. The magnitude of the Kerr coefficient of doped polynorbornene at 633 nm wavelength is 7 times that of nitrobenzene.
9. The two-photon absorption coefficient of doped poly($\beta$-pinene) at 810 nm is 2.6 cm/MW which is the largest value presently known for any material.

The invention claimed is:
1. The dopted nonconjugated polymer poly($\beta$-pinene) having enhanced third order optical and/or quadratic electro-optic characteristics.

\* \* \* \* \*